(12) United States Patent
Strom et al.

(10) Patent No.: US 7,478,224 B2
(45) Date of Patent: Jan. 13, 2009

(54) MICROPROCESSOR ACCESS OF OPERAND STACK AS A REGISTER FILE USING NATIVE INSTRUCTIONS

(75) Inventors: Oyvind Strom, Trondheim (NO); Erik K. Renno, Trondheim (NO); Kristian Monsen, Oslo (NO)

(73) Assignee: Atmel Corporation, San Jose, CA (US)

( * ) Notice: Subject to any disclaimer, the term of this patent is extended or adjusted under 35 U.S.C. 154(b) by 153 days.

(21) Appl. No.: 11/107,235

(22) Filed: Apr. 15, 2005

(65) Prior Publication Data
US 2006/0236077 A1    Oct. 19, 2006

(51) Int. Cl.
G06F 9/30 (2006.01)
(52) U.S. Cl. .................................. 712/209; 712/212
(58) Field of Classification Search .................. 712/209, 712/212, 229
See application file for complete search history.

(56) References Cited

U.S. PATENT DOCUMENTS

| | | | | |
|---|---|---|---|---|
| 5,696,959 A | 12/1997 | Guttag et al. | ............... | 395/595 |
| 5,812,868 A | 9/1998 | Moyer et al. | ........... | 395/800.23 |
| 5,925,123 A * | 7/1999 | Tremblay et al. | ............ | 712/212 |
| 5,937,193 A | 8/1999 | Evoy | ........................... | 395/705 |
| 5,978,901 A | 11/1999 | Luedtke et al. | .............. | 712/222 |
| 6,021,469 A | 2/2000 | Tremblay et al. | ........... | 711/125 |
| 6,026,485 A | 2/2000 | O'Connor et al. | ........... | 712/226 |
| 6,038,643 A * | 3/2000 | Tremblay et al. | ........... | 711/132 |
| 6,076,155 A | 6/2000 | Blomgren et al. | ........... | 712/225 |
| 6,256,725 B1 | 7/2001 | Batten et al. | ................ | 712/200 |
| 6,324,686 B1 | 11/2001 | Komatsu et al. | ............... | 717/5 |
| 6,332,215 B1 | 12/2001 | Patel et al. | ..................... | 717/5 |
| 6,338,160 B1 | 1/2002 | Patel et al. | ..................... | 717/5 |
| 6,513,156 B2 | 1/2003 | Bak et al. | ................... | 717/151 |
| 6,654,954 B1 | 11/2003 | Hicks | ........................ | 717/162 |
| 6,826,749 B2 | 11/2004 | Patel et al. | .................. | 717/148 |

(Continued)

FOREIGN PATENT DOCUMENTS

JP    2003280894 A  * 10/2003

(Continued)

OTHER PUBLICATIONS

J. Glossner et al., "The DELFT-Java Engine: An Introduction", 3rd Int'l Euro-Par Conference, (Euro-Par '97 Parallel Processing), Aug. 27, 1997, Passau, Germany, 5 pages.

(Continued)

Primary Examiner—Aimee J Li
(74) Attorney, Agent, or Firm—Schwegman, Lundberg & Woessner, P.A.

(57) ABSTRACT

A combined native (RISC or CISC) microprocessor and stack (Java™) machine are constructed so that Java™ VM instructions can be executed in hardware. Most Java™ instructions are executed directly, while more complex Java™ instructions, such as those manipulating Java™ objects, are executed as native microcode. In order for native microcode instructions to access the Java™ operand stack, a Java™ operand stack pointer points to the register file location that is the current top of the stack, while a remap bit in the status register indicates that registers specified in native instructions are remapped as the maximum Java™ operand stack pointer value minus the present value of the Java™ operand stack pointer.

27 Claims, 4 Drawing Sheets

U.S. PATENT DOCUMENTS

| | | | |
|---|---|---|---|
| 6,990,567 B1 * | 1/2006 | Cohen et al. | 712/202 |
| 7,080,362 B2 * | 7/2006 | Patel et al. | 717/139 |
| 2003/0115238 A1 * | 6/2003 | O'Connor et al. | 709/100 |
| 2004/0015678 A1 | 1/2004 | Strom | 712/202 |
| 2004/0024989 A1 | 2/2004 | Chauvel et al. | 712/41 |
| 2004/0024990 A1 | 2/2004 | Chauvel et al. | 712/209 |
| 2004/0059893 A1 | 3/2004 | Chauvel et al. | 712/208 |
| 2004/0078550 A1 | 4/2004 | Chauvel et al. | 712/34 |

FOREIGN PATENT DOCUMENTS

| | | |
|---|---|---|
| WO | WO-0161475 A1 | 8/2001 |
| WO | 2002/086699 | 10/2002 |
| WO | WO-06112978 A3 | 10/2006 |

OTHER PUBLICATIONS

Jazelle website, Jazelle™ Technology for Java Applications, ARM Product Information, 4 pages.

Jazelle website, "ARM® Architecture Extensions for Java Applications", 6 pages.

Oyvind Strom et al., "A Novel Approach for Executing Byte Compiled Java Code in Hardware", ICCA Newsletter, Jun. 2000.

Paper: Peter Clarke, "ARM Tweaks CPU Schemes to Run Java", Electronic Engineering Times, CMP Media, Inc., Copyright Oct. 2000, 2 pages.

A.K. Betts et al., "SMILE: A Scalable Microcontroller Library Element", Microprocessing and Microprogramming, vol. 39, (1993), pp. 259-262.

Jazelle website, Jazelle™ Technology for Java Applications, ARM Product Information, 4 pages, 2001.

Jazelle website, "ARM® Architecture Extensions for Java Applications", 6 pages, 2003.

"European Application Serial No. 0678096.4, Examiners Report mailed Jun. 30, 2008", Examiner's Report, 8 pages.

Xin, L., et al., "The architecture of the java extension of 32-bit RISC for smart cards and other embedded systems.", *ASIC, 2003 Proceedings. 5th International Piscataway On Oct. 21-24, 2003*, (Oct. 21, 2003), 397-400.

* cited by examiner

MICROPROCESSOR ACCESS OF OPERAND STACK AS A REGISTER FILE USING NATIVE INSTRUCTIONS

TECHNICAL FIELD

The present invention relates to accessing register file stacks in microprocessors, including microprocessors with memory-oriented architectures (e.g., complex instruction set computers or CISC machines) and those with load-store architectures (e.g., reduced instruction set computers or RISC machines), as well as stack machines including those having Java™ Virtual Machine core architectures. Combined architectures operable in a RISC or CISC state and also in a Java™ state are especially pertinent. More particularly, the invention relates to accessing operand stacks using instructions native to the architecture, such as accessing a Java™ operand stack from the RISC state.

BACKGROUND ART

Microprocessors can be divided into several basic categories. In stack machines, all arithmetic-logic unit (ALU) operations are done on the uppermost register of an operand stack. In CISC machines, the operations are done directly in memory (i.e., operands are accessed from memory and the results stored in memory). In RISC machines, all operations are performed on addressable registers residing in the central processing unit (CPU). While the early microprocessors were stack machines, today most microprocessors are either CISC or RISC machines. With time, CISC and RISC machines have approached each other in design, with most modern CISC machines also having a register file where operations are performed. With the introduction by Sun Microsystems, Inc. of the Java™ programming language and the Java™ Virtual Machine (Java™ VM), the stack machines were reintroduced into modern microprocessors. Although the Java™ VM was intended primarily to run as software, there exist some hardware implementations.

Java™ is an object-oriented programming language, developed by Sun Microsystems, Inc., that has become a de facto standard in network programming and is also beginning to be utilized in the domain of embedded systems. The Java™ byte code is commonly executed in a software layer called the Java™ Virtual Machine, the specification for which is published by Sun Microsystems, Inc. To execute the Java™ byte code, an interpreter, or a "just-in-time" compiler, preferably in conjunction with some form of look-ahead technique to analyze potential program flow bottlenecks, or a cross-compiler for a specific hardware platform may be used. Alternatively, Java™ can be executed directly in silicon. Some Java™ hardware processors have a folding mechanism, which means that several instructions are combined and executed as one. However, most Java™ processors will operate as an interpreter, wherein each opcode is read and then the appropriate action is taken to execute the instruction.

The hardware approach is the preferred technical solution if Java™ is to be implemented in embedded systems, and in recent years, several hardware versions of Java™ virtual machines have been developed for embedded processor platforms. These processors, which support direct execution of Java™ instructions, are usually designed as 32-bit stack machines. Some rely on extensions to the Java™ binary format in order to offer features like direct addressing and bit manipulation instructions. Others do not execute Java™ binary codes directly, but have a very close architectural match to thereby increase performance of the virtual machine.

A major challenge when attempting to implement a Java™ VM in hardware is that some Java™ instructions have high semantic content and thus are very difficult to execute as atomic instructions. Trapping complex Java™ instructions and executing them as software routines with instructions native to the host architecture is a possible solution. But in order to do this, a mechanism is needed to access the Java™ operand stack using the native (RISC or CISC) instructions.

In the present assignee's earlier U.S. patent application Ser. No. 10/114,678, filed Apr. 1, 2002, with priority from U.S. provisional application 60/286,197, filed Apr. 23, 2001, entitled "Microprocessor for executing byte compiled Java™ code," and published as US 2004/0015678 A1 on Jan. 22, 2004, and in the corresponding international application published as WO 2002/086699 A3 on Oct. 31, 2002, the concept of combining a RISC machine with a Java™ VM is described. In that earlier published application, a RISC microprocessor and a Java™ VM implemented in hardware are combined such that the hardware can operate in either a RISC state or a Java™ state. In order for the RISC microprocessor to access the Java™ operand stack and execute complex Java™ instructions as a RISC software routine, two bits, "X" and "Y," are set in the status register to allow either the corresponding X or Y argument to be substituted with the register number that is pointed to by the operand stack pointer.

Additional mechanisms are sought for these combined microprocessors to improve access to the Java™ operand stack from the processors' RISC (or CISC) state.

DISCLOSURE OF THE INVENTION

The present invention implements both a RISC (or CISC) machine and a stack machine (such as the Java™ VM) in the same microprocessor core. The microprocessor contains a register file. Consistent with prior RISC (or CISC) machines, instructions that operate on the register file specify the register numbers that are the source of the operands and the destination of the result. The stack machine uses a portion (e.g., the lower half) of the same register file to hold a Java™ operand stack. A Java™ operand stack pointer register is provided, which points to the top of the stack and therefore determines which registers are operated upon whenever the processor is in Java™ state. A status register not only includes a bit that specifies when the processor is in a Java™ state, but also includes a Java™ register remap bit used when the processor is in a RISC (or CISC) state to access the Java™ stack. In RISC (or CISC) state, the remap bit when set causes register numbers specified in an instruction, whenever they correspond to registers in the Java™ operand stack, to be remapped to access registers relative to the top of the stack. That is, the register number accessed equals the maximum value of the operand stack pointer minus the value of the operand stack pointer. If the remap bit has been reset to zero, then the register number accessed is that which is specified in the instruction. The remap bit is disregarded in the Java™ state. The remap bit effectively allows a RISC (or CISC) instruction to access operands from the Java™ stack, for example to obtain operands from the top of the stack and the element below the top of the stack and place the results at the top of the stack, regardless of which register actually holds the top of the stack value.

BEST MODE OF CARRYING OUT THE INVENTION

The present invention may be adapted to either combined RISC/Java™ processor architectures or combined CISC/Java™ processor architectures, or more generally to any combination of a stack machine with a native RISC or CISC processor. As already noted, the invention particularly involves a technique for accessing an operand stack, not only when the processor is in its stack machine or Java™ state, but also when the processor is in its native RISC or CISC state. For purposes of illustration, the remainder of the description will focus on a combined RISC/Java™ processor architecture and illustrate the inventive technique in that context. Those skilled in the art will readily understand how to adapt the described RISC/Java™ version of the invention for use in the other applicable processing architectures.

The Java™ VM instruction set presently includes 201 opcodes. A large part of the instruction set is type specific, so there are many Java™ instructions having the same meaning but applied to different operand types. Instruction sets of RISC processors vary according to each architecture's particular design features, but a typical RISC instruction set may include instructions such as: LOAD, STORE, MOVE, ADD, SUBTRACT, MULTIPLY, DIVIDE, NEGATE, AND, OR, XOR, COMPARE, SHIFT, ROTATE, SET, CLEAR, JUMP and RETURN. A large part of a typical RISC instruction set overlaps with the Java™ VM instruction set. For example, the most frequently executed instructions in both Java™ and RISC states are load/store instructions, which have the same semantic content under both states and can share the same hardware resources in a combined RISC/Java™ architecture. Likewise, basic arithmetic and logical operations share the same meaning and make use of the shared arithmetic/logic unit (ALU) in the same way. However, some low-level bit manipulation instructions may be found only in the RISC instruction set and not in the Java™ VM instruction set. Likewise, Java™ includes high-level object creation and manipulation instructions, not found in a typical RISC instruction set.

The Java™ VM instruction set includes some instructions with a high semantic content which are difficult to implement in hardware. It is usually not feasible to execute such high-level instructions in a single clock cycle, and the task of breaking them up into several less complex instructions is difficult in respect to resource allocation and timing constraints. In order to reduce the hardware overhead, these Java™ instructions may instead be trapped and executed in the combined RISC/Java™ processor as small RISC programs. Trapped instructions would typically amount to less than 10% of all executed instructions. The RISC programs for each such instruction are stored in program memory that is accessible to the processor, and may be changed as needed by a programmer. This gives full flexibility with regard to any future extensions of the Java™ instruction set. But the execution of high-level Java™ instructions as RISC programs requires that the combined processor still be able to access the Java™ operand stack whenever it switches to RISC state to execute those instructions. The results of the operation will also need to be accessed from the stack when the processor returns to the Java™ state.

Figure 1:
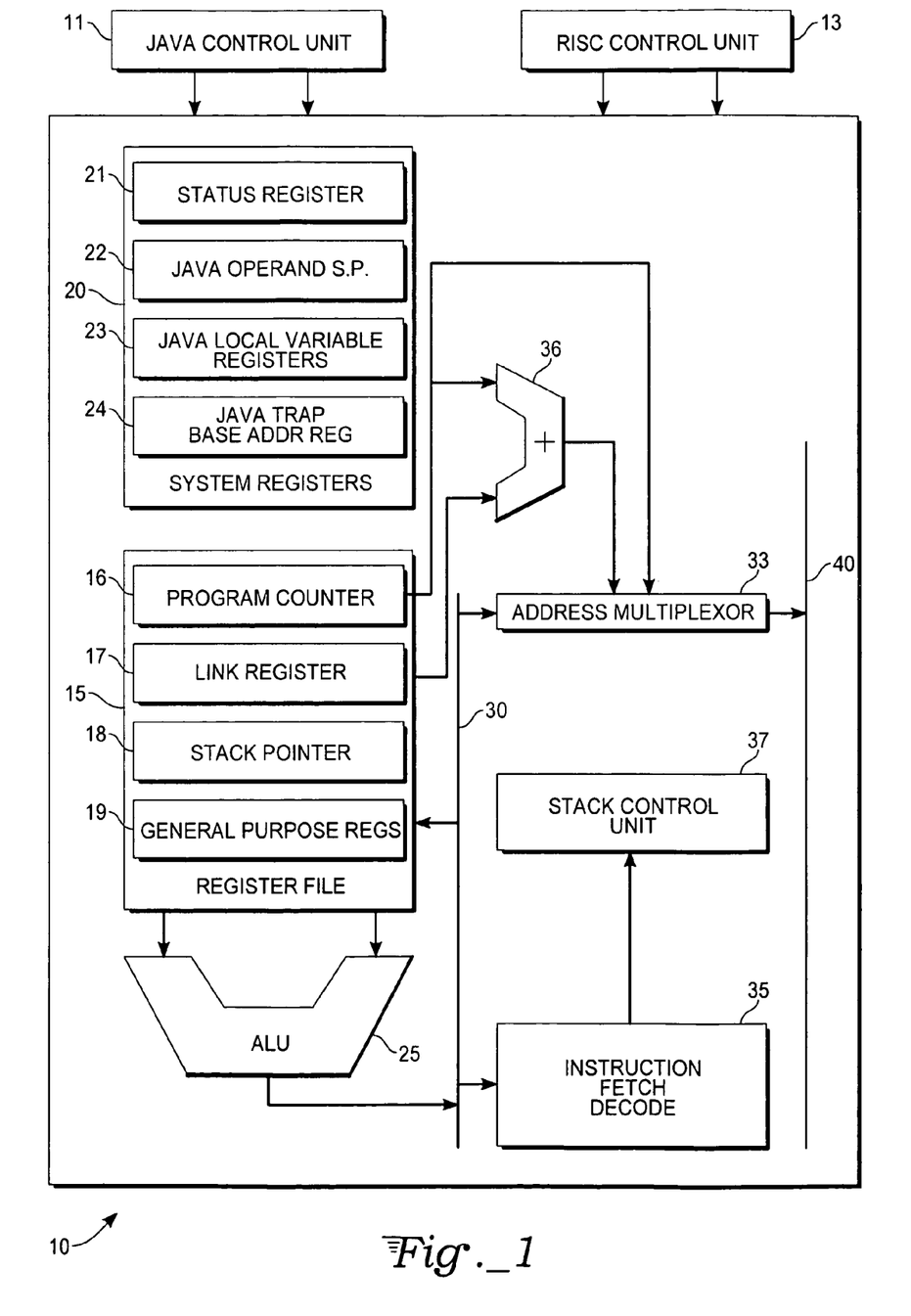
FIG. 1 is a block diagram of a combined RISC/Java™ microprocessor architecture sharing common core processor elements.

With reference to FIG. 1, a typical combined RISC/Java™ microprocessor which can be adapted to make use of the present invention may include a RISC processor, a Java™ module for executing a first set of Java™ instructions in the RISC processor, a RISC module for executing a second set of Java™ instructions as microcode in the RISC processor, and a data path in the RISC processor, including a register file, shared by both modules. As seen in FIG. 1, a microprocessor 10 in accord with the present invention includes both a Java™ control unit 11 and a RISC control unit 13, which share a common data path. The two control units 11 and 13 operate independently but never operate the processor simultaneously. The processor 10 does not rely on translations or extensions to the Java™ binary format like other Java™ processors, but offers two orthogonal programming models. The processor 10 can be constructed as a basic von-Neumann architecture sharing a common bus for both data and instructions, or can easily be expanded to a Harvard architecture with a separate data and instruction bus. The processor can be pipelined to achieve high clock frequencies and a single cycle execution.

The microprocessor includes a register file 15 connected to a data bus 30. A program counter 16, link register 17, and stack pointer 18 may be mapped into the register file 15, along with any number of general-purpose registers 19. This mapping to the register file 15 allows the program counter 16, link register 17 and stack pointer 18 to be addressed in the same way as the general-purpose registers 19, so that ordinary instructions can use these registers whenever desired. Being able to address the stack pointer 18 as an ordinary register simplifies allocation and access of local variables and parameters. The stack pointer 18 may also be used implicitly by several instructions. The program counter 16 contains the address of the instruction being executed. The memory space is byte addressed. With the exception of Java™ state, the instruction size may be a multiple of two bytes with the least significant bit of the program counter fixed to zero. Because the program counter 16 is mapped into the register file 15, it can be used as a source or destination operand in all instructions using register operands (e.g., load/store, arithmetic and logical instructions). Instructions using the program counter 16 as their destination register are treated the same way as jump instructions, with the pipeline flushed and execution resumed at the address specified by the new program counter value. The link register 17 is used to hold return addresses for subroutine calls, as well as for supervisor calls, interrupt requests and exception handling. The link register location can be used as a general-purpose register at all other times. Separate register files may be included for the interrupt and exception modes to allow higher performance with lower interrupt latencies.

Status register 21 is distinct from the register file 15 and, along with a Java™ operand stack pointer 22, Java™ local variable registers 23 and a Java™ trap base-address register 24, may instead be mapped into the system register space 20. The status register 21 may include the usual arithmetic/logical operation flags (e.g., saturation, overflow, sign, zero and carry flags), mode bit settings (e.g., application, supervisor, interrupt and exception modes), a debug state bit, and interrupt, exception and debug masking bits. Additionally, of particular interest for the present invention, the status register 21 includes a Java™ state bit and a Java™ register remap bit. The processor 10 is in its Java™ state whenever and only when the Java™ state bit in the status register 21 is set. This bit is cleared at reset and should only be modified when Java™ execution completes, or by interrupts and exceptions, or by defined instructions (such as JCALL or RETJ, where the former is used to initiate a Java™ state, while the latter is used to return to the Java™ state after an instruction trap). Attempts by a user to modify this Java™ state bit manually may result in undefined behavior. Whenever the Java™ register remap bit is set, the register file 15 is remapped to access variables as in a stack machine. This bit is cleared at reset. Undefined behavior may result if this bit is written to outside of the Java™ VM. The effect of this remap bit will be described in more detail below. The Java™ operand stack pointer 22 in the system register space 20 is used to hold the location in the register file space of the current top of the Java™ operand stack. The Java™ trap base address register 24 contains the base address to the program code for the trapped Java™ instructions. Java™ local variable registers 23 store temporary Java™ local variables. Additionally, Java™ trap entry-point registers may contain offsets from the base address pointer to exception routines for the entry points of unimplemented Java™ instructions. Other system registers may be provided as needed by a particular hardware processor design.

An arithmetic logic unit (ALU) 25, used in both RISC and Java™ states, is connected to the register file 15 and the output of the ALU is supplied to a data bus 30. A typical ALU may include a 32-bit adder, 32-bit barrel shifter and hardware multiplier. Arithmetic and logical operations execute in a single clock cycle. In addition to 32-bit word size data types, the processor typically supports half-word and byte data types without penalty in code size or performance. Memory load and store operations are typically provided for byte, half-word, word and double word data with automatic sign- or zero-extension of byte and half-word data.

The outputs of the program counter 16 and related register files are processed through an adder 36 leading to an address multiplexer 33. The address multiplexer 33 is also connected to the address bus 40. An instruction fetch decoder 35 receives a signal from the data bus 30 and provides an output to a stack control unit 37. This or other typical arrangements of the processor architecture can be used with the present invention.

Because a large part of the RISC and Java™ VM instruction sets overlap, a combined RISC/Java™ processor shares hardware resources, but is provided with a separate Java™ instruction decoder and control module 11 that takes over execution when the processor is in its Java™ state. The processor keeps track of its execution state through its status register 21 and can change execution states seamlessly. In a larger runtime system, of which the processor is a part, there will typically be an operating system that keeps track of and dispatches different processes. A Java™ program will typically be one of several of such processes. There is little, if any, extra overhead connected with a context switch to a Java™ process compared to a context switch to a native process (RISC or CISC). Also, when the processor switches instruction decoder (RISC control module 13 to Java™ control module 11, or vice versa), it does not affect the security level set by the system. Further, a Java™ program can, in principle, be executed from different interrupt levels without interfering with the mode settings of the processor, but generally it is not recommended that interrupt routines be written in Java™ due to increased latency relative to corresponding RISC interrupt routines.

Figure 2:
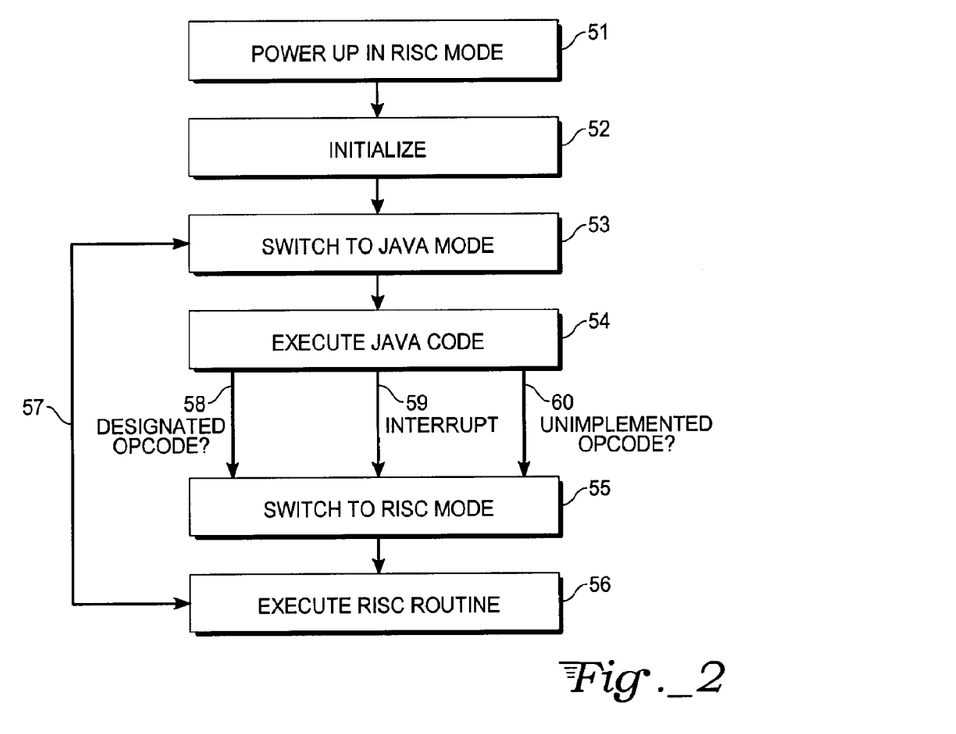
FIG. 2 is a flow diagram for a normal run sequence of the processor in FIG. 1.

With reference to FIG. 2, the microprocessor powers up 51 in the RISC state in order for the initialization code to execute. After initialization 52, the microprocessor may execute applications as a normal RISC processor, or may switch to its Java™ state 53 and start executing a Java™ program 54. To invoke a Java™ program, the Java™ VM is called like any other application. In particular, the Java™ VM will execute an initialization routine followed by a class loader that parses the class and initializes the registers necessary to start executing the Java™ program. The last instruction in the class loader is the jcall instruction that sets the processor in the Java™ state. This means that the instruction decoder now decodes Java™ opcodes instead of native RISC opcodes. The microprocessor will continue to operate in the Java™ state until one of these events occurs: a designated Java™ opcode for switching back to RISC mode 58, an interrupt request 59, or an unimplemented Java™ instruction 60. If any of these events occur, the processor will jump to a pre-defined address and switch to RISC mode 55 and in this way handle the event. Upon finishing the RISC routine 56, the processor will return to the Java™ state 57 using the RETJ instruction and continue to execute the Java™ code at the point where it left off.

Thus, in the Java™ state the processor is able to execute the Java™ parts of a program. Such parts may be network capabilities or algorithms that are already implemented in a company's software library, and constitute modules of legacy software for reuse. The processor's RISC state aids in execution of the Java™ code by executing complex Java™ instructions 60 as RISC microcode. It also provides a flexible hardware interface that can be used, for example, to control highly specialized peripheral devices like sensors and actuators.

In order to be compatible with the Java™ VM specification, all Java™ instructions need to be implemented. However, in an embedded processor targeted for small to medium applications, several of the number formats supported by the Java™ Virtual machine are excessive. For instance, there are few processors in this segment that offer floating point units. Several of the more complex instructions of Java™ have to be trapped and executed as microcode. By "complex" we mean that a single Java™ instruction requires multiple machine clock cycles to execute. During execution of a Java™ program, whenever the processor encounters a bytecode that is not supported in hardware, the instruction decoder will automatically recognize these bytecodes, switch the processor into its RISC state and at the same time jump to a predefined entry point (defined relative to the address stored in the Java™ trap base-address system register, with the offset applied to the base address depending upon the particular trapped instruction). It will then execute the RISC software routine that performs the semantic of the trapped bytecode. When finished, the routine ends with a return-to-Java state (RETJ) instruction.

Which Java™ instructions to trap and which to implement directly into hardware is usually an implementation specific issue decided by the designer. Typically, those instructions that create or manipulate Java™ objects are trapped. Other trapped instructions may include those that operate on long (64-bit or multi-word) data types, those of the type float and double, and any that are incompatible with the designed architecture.

Which RISC instruction set to use depends on the RISC model chosen, as the present invention can also be used with other types of RISC architectures in addition to the RISC architecture described herein. (As noted above, the invention is also adaptable for use with a CISC architecture and instruction set.)

Figure 3:
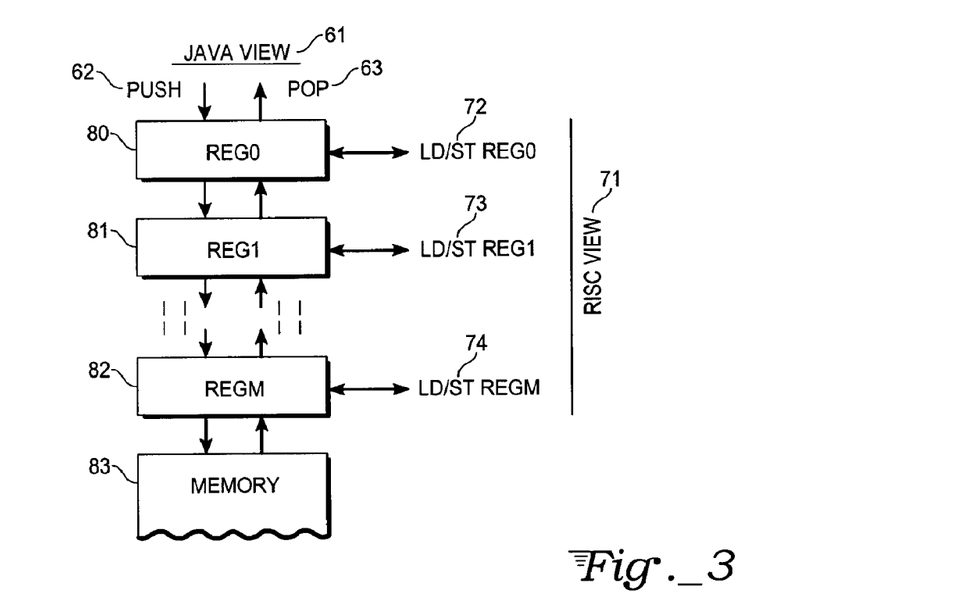
FIG. 3 is a block diagram showing a relevant portion of the microprocessor's register file, as seen by the respective RISC and Java™ states.

With reference to FIG. 3, the processor's register file has the function of a push-pop stack in its Java™ state, but functions as a conventional load/store register file in the native RISC state. This is also the module that allows the two virtual processors to communicate, provided values in the Java™ stack can be accessed by the processor in its RISC state. FIG. 3 shows half of the register file as it is seen from the RISC and Java™ modes. The registers 80, 81, ..., 82 are seen by both the Java™ control unit 61 and the RISC portion of the circuit 71.

The RISC view of the register file architecture 71 sees register elements 80, 81, ..., 82 as a set of load/store registers 0 through M, and the RISC architecture interfaces these registers with the data memory by means of corresponding load/store instructions 72, 73, ..., 74 designating the particular register as a source or destination. Recall that the program counter, link register and stack pointer are included in the register file along with general-purpose registers. In order to preserve orthogonality, these special registers are accessible like any other register.

The Java™ control unit 61 views the same register file as a push-pop stack, typically with about (M+1)/2 register elements. Data is pushed 62 into the register stack and is popped 63 out of the register stack to the Java™ control unit. The remaining registers may be used, among other things, for the program counter, stack control registers, and temporary scratch-pad registers. The stack is implemented as a circular stack and the stack sizes required are relatively small. The stack size is scalable, and the number of stack elements is left as an implementation specific issue. A stack overflow/underflow can be copied out in the memory 83 through an overflow/underflow mechanism. Possible stack overflow/underflow mechanisms can also be developed in a case-by-case manner.

Figure 4:
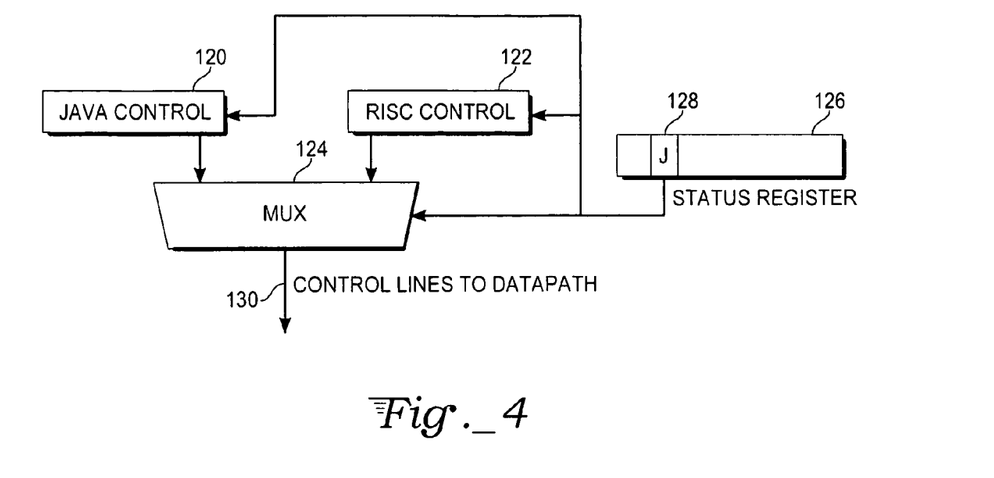
FIG. 4 is a block diagram illustrating an exemplary mechanism for transferring the processor of FIG. 1 between RISC and Java™ states.

FIG. 4 shows one possible implementation of a mechanism for transferring the microprocessor from one state to another. Java™ and RISC control modules, 120 and 122, are connected through a multiplexer 124 to control lines 130 leading to a shared data path of the processor. A status register 126 contains a Java™ state bit 128 that is supplied to the Java™ and RISC control modules 120 and 122, and determines which of these control units is in operation. The Java™ state bit 128 also serves as the selection control by the multiplexer 124. Control is transferred at a predefined state in both control modules. Control is therefore transferred synchronously where both machines will be in the same defined state.

Java™ instruction trapping involves steps similar to that of a typical interrupt mechanism. When an unimplemented instruction occurs, the Java™ control module detects this and the return address is stored on the top of the stack. Then, the processor switches to RISC mode and fetches a jump address from a predefined location in the memory. The RISC module then continues execution at the address fetched in the last step. Having the trapping mechanism be similar to the interrupt mechanism achieves maximum flexibility since only the first jump address is predefined in the design. This will enable the software linker to optimally plan the memory usage by only linking the RISC routines for the Java™ opcodes actually present in the program, thus saving precious memory space. The RISC routine should end by popping the program counter off the top of the stack and saving it in the program counter register. This will ensure that the Java™ program continues at the correct place. Additionally, the microprocessor has a stack overflow/underflow handling mechanism. This mechanism in the Java™ push-pop stack can be implemented by reusing existing logic for instruction trapping. When an overflow occurs, the processor traps the overflow flag and jumps to a predefined address where it finds a jump vector to the software procedure that will handle the overflow/underflow condition.

Figure 5:
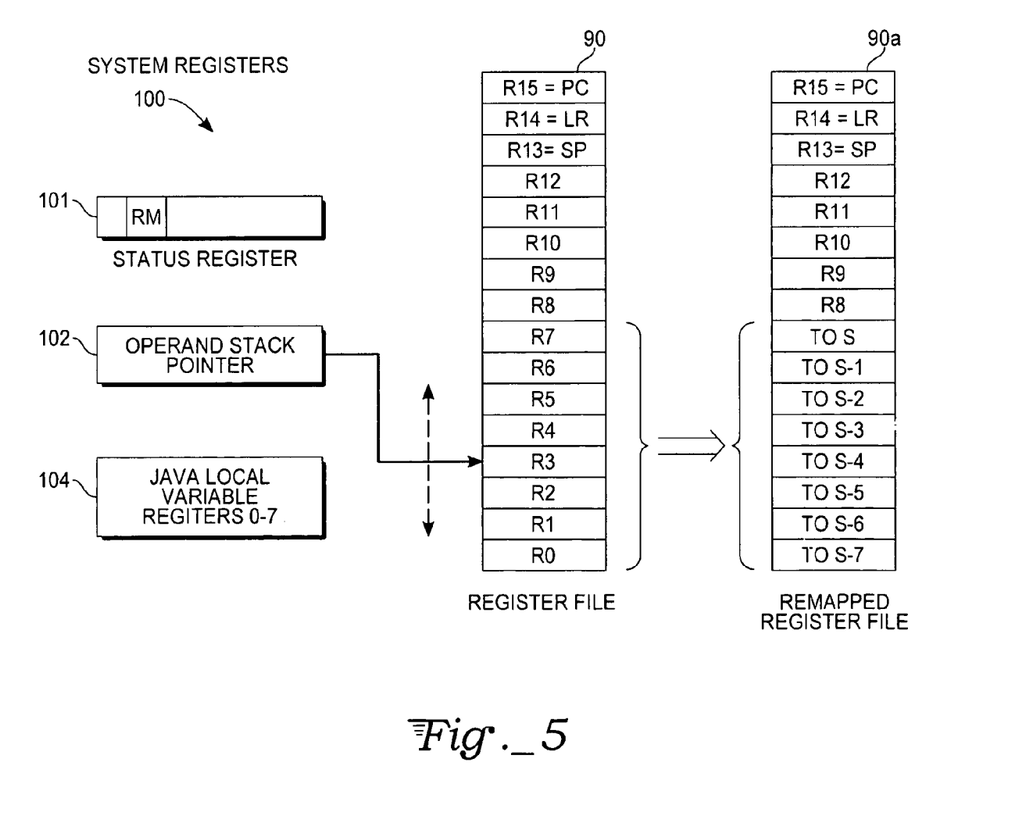
FIG. 5 is a block diagram of relevant portions of the system register space and register files, illustrating the remap operation of the present invention, when executing trapped Java™ instructions in the processor's RISC state.

With reference to FIG. 5, the function of the register file differs in the Java™ and RISC states. In both states, three registers (here R15-R13) are dedicated to the program counter (PC), link register (LR) and the system or application stack pointer (SP), as already discussed above. In the RISC state, the other registers (here R12-R0) of the register file 90 are available for normal RISC operations, such as addressing operands. In the Java™ state, the Java™ VM executes as a zero operand stack machine, and so the register file functionality is changed to facilitate a push-pop stack, where the current top of the operand stack may be any of ToS through ToS-7 (here using registers R7-R0). Additionally, other registers (such as R9 and R8) may be used in the Java™ state as a frame register containing the address for the current frame pointing to the Java™ local variable 0 (one of seven Java™ local variable registers 104 in the system register space 100), and as a constant pool register containing the address to the constant pool of the current Java™ class. In addition to the Java™ local variable registers, the system register space 100 includes an operand stack pointer 102 that points to the current top of the operand stack (again, any of ToS through ToS-7).

The Java™ operand stack (ToS through ToS-7) holds the values to be operated on by a Java™ instruction, and the result of the operation. The operand stack is part of the current method frame, and a part of the operand stack is held in the register file in order to speed up operation. The register file typically holds up to eight elements of the operand stack, as shown here, the remainder of the stack being stored in memory as part of the Java™ VM frame. (The frame is a runtime data structure that holds all variables and references to support the execution of a Java™ method, and may contain incoming arguments to the method as well as outgoing arguments to an invoked method. A frame is allocated when the method is invoked and destroyed when the program returns from the method. An exemplary frame may include the operand stack, local variables, a pointer to a free memory space where the next frame can be placed, a return address for the method, a frame pointer for the previous method as well as a constant pool pointer and stack pointer for the previous method.) The system registers 100 include a Java™ operand stack pointer 102 that has two functions. It shows the number of elements on the operand stack, and also points (e.g., in bits [2:0]) to the register that holds the current top of the stack. The operand stack pointer is initialized to a 0 value, meaning that the operand stack is empty. If the operand stack overflows or underflows, an exception is generated, and the exception routine is responsible for copying the contents of the operand stack from the register file to the current method frame stored in memory. (For example, in a register file containing a stack of up to eight elements, an overflow condition occurs whenever a ninth element is pushed onto the stack. An underflow condition occurs if an access is attempted from an empty stack.)

Trap routines need to access the Java™ operand stack in the processor's RISC state. To avoid the cumbersome process of having to read out the Java™ operand stack pointer 102 and translate it to the correct register, the processor's Java™ control unit performs a register remapping operation that generates a remapped register file 90a, prior to transferring control to the RISC unit, that ensures that the top of the stack (ToS) is always in register R7, ToS-1 is always in register R6, etc. In the status register 101, a remap bit RM is provided. This remap bit RM is disregarded whenever the processor runs as a stack machine, i.e. in the Java™ state. In the processor's native RISC state, however, the remap bit RM has the following semantic:

if RM is 0, then register number accessed=register number specified (i.e., no remapping occurs);

if RM is 1, then register number accessed=max value of operand stack pointer—value of operand stack pointer.

For example, in an eight register stack ToS to ToS-7, the maximum value of the operand stack pointer would be 7. With the remap bit RM set to "1," the register numbers R7 to R0 will access the registers that hold stack elements ToS through ToS-7 respectively. A RISC instruction, add R7, R6 will then effectively add ToS and ToS-1. If the operand stack pointer were to point to register R3, then the actual registers where ToS and ToS-1 are stored are R3 and R2, respectively, and the add operation will use these two physical registers for the add operation.

Figure 7:
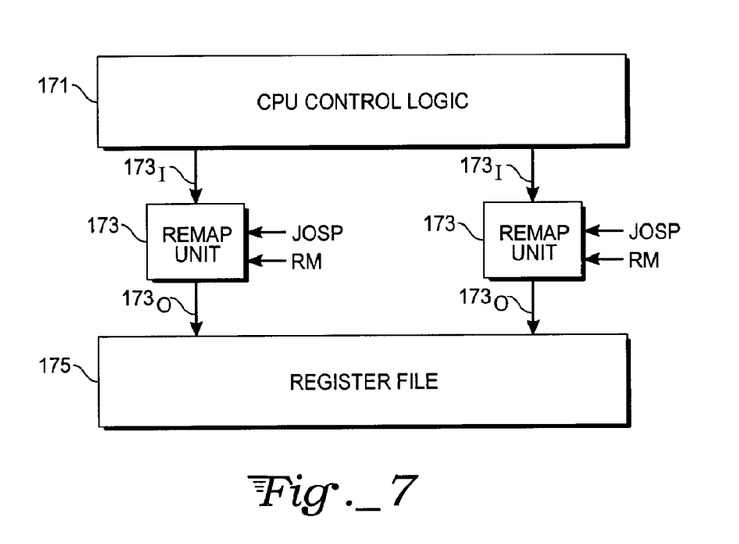
FIG. 7 is a block diagram of the microprocessor together with its processor control unit and remap units in accord with the present invention.

FIG. 7 shows a typical arrangement in which remap units 173 are attached to the outside of the RISC processor's control unit 171. The logic circuitry forming each remap unit 173 is replicated for as many times as there are read and write ports in the register file 175. Each remap unit 173 has control inputs RM (=1 for enabling a remap operation; =0 for passing the received register address without remapping) and JOSP from the Java™ operand stack pointer (102 in FIG. 5) indicating the top of stack location. (JOSP is generally a multibit signal corresponding to the number of remappable register locations.) Each remap unit 173 has a register address input $173_I$ and a register address output $173_o$. The register address inputs $173_I$ receive separate register addresses from the processor control logic 171. The register address outputs $173_o$ then output the corresponding physical register addresses to the ports of the register file 175. For the example given above in FIG. 5, where the Java™ operand stack pointer 102 provides a top-of-stack value of 3 (JOSP=3); then whenever RM=1, if the register address inputs 173, are 7 and 6, respectively (e.g., for the instruction: add R7, R6), the register address outputs $173_o$ will give the remapped values 3 and 2 as the actual physical locations in order to access registers R3 and R2 in the register file 175.

When pushing new values to the operand stack, a special, increment-Java-operand stack pointer instruction "incjosp" must be used to ensure stack consistency. This instruction will increment the operand stack pointer 102 by a specified amount N, and thereby pushes all the operand stack elements N-elements down. This frees N elements on the top of the stack. The value going onto the stack can thereafter be moved to R7. The incjosp instruction can also be used to pop elements off the stack, by decrementing the operand stack pointer. The instruction will also automatically handle stack overflow/underflow conditions as they arise in the manner previously described.

Java™ local variables are also accessible to the RISC trap routines as system registers 104 for the first eight variables. For more variables, they are accessible in the current frame in memory.

Figure 6:
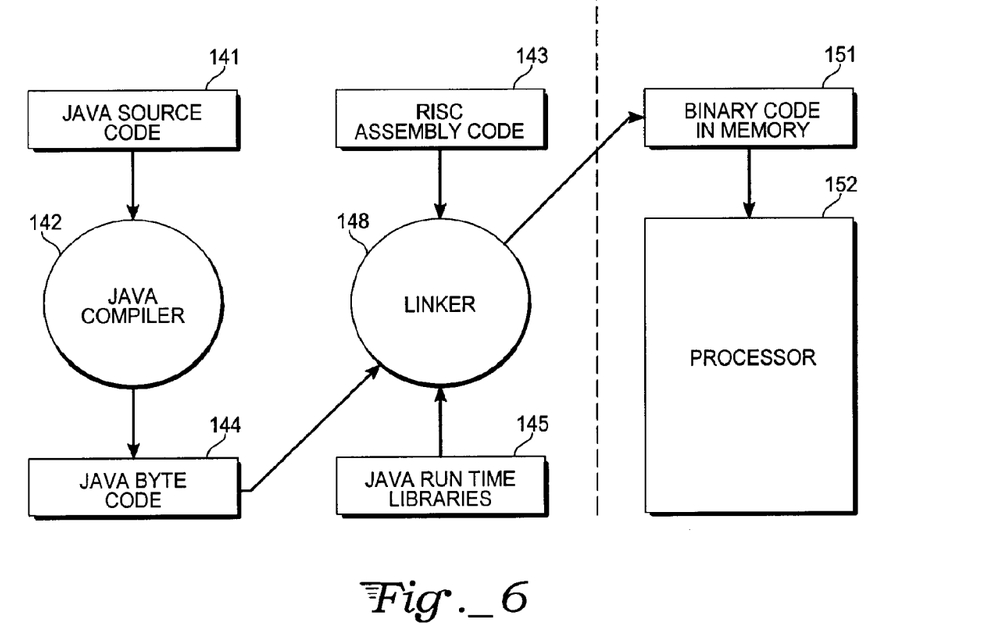
FIG. 6 is a block diagram a runtime system in which the microprocessor of FIG. 1 would typically be implemented.

With reference to FIG. 6, a typical run-time environment for a system with this processor concept is shown. A developer can compile Java™ source code 141 in an ordinary Java™ compiler 142 and end up with Java™ byte code 144. If the processor accommodates an operating system with a file loader and an automatic memory management system, the rest of this process can occur dynamically and automatically. However, small embedded systems often do not need an operating system and then the rest of this process must be done manually in the sense that a memory image of the program has to be created on an external platform. The Java™ byte code 144 have to be parsed through a linker 148. The program run through the linker will (1) verify that the byte code does not contain any illegal opcodes, modify codes or operands depending on instrumentation solutions, (2) link the application with the specified Java™ class run-time libraries 145, (3) link an assembly code to the RISC part 143, set up a heap area, set up branch and jump addresses, and make a memory map. The output from the linker will be a memory image that can be transferred to the ROM or flash memory 151 in the embedded system 152. Much of the purpose of making a Java™ processor is that the programmer should be able to use the Java™ programming language as unconstrained as possible. However, in this case, only supported types can be used and only a limited run-time library will be available. These constraints are, however, not limiting for the use of the main features of Java.

The Java™ VM specification presently contains 201 instructions; many of them type specific and essentially duplicates for different data types. The number of instructions hardware implemented, and the number of instructions trapped, depends on the RISC architecture that is used. Other types of RISC architectures will have an effect on the number of instructions hardware implemented and trapped. The following instructions were not hardware implemented in the preferred embodiment of the present invention since these instructions are not considered as important in a small embedded processor: all instructions of type "float," all instructions of type "double," and all instructions of type "long." This eliminates approximately 90 instructions from the 201 possible Java™ instructions. Of the remaining instructions, 68 instructions are implemented in the Java™ Virtual machine and 43 instructions are trapped and are executed as RISC routines. The Java™ instructions that are trapped and executed as RISC routines are noted below in Table 1.

TABLE 1

| Opcode | Mnem. |
|--------|-------|
| 18 | ldc |
| 19 | ldc_w |
| 20 | ldc2_w |
| 91 | dup_x2 |
| 93 | dup2_x1 |
| 94 | dup2_x2 |
| 98 | fadd |
| 99 | dadd |
| 102 | fsub |
| 103 | dsub |
| 105 | lmul |
| 106 | fmul |

TABLE 1-continued

| Opcode | Mnem. |
|---|---|
| 107 | dmul |
| 109 | ldiv |
| 110 | fdiv |
| 111 | ddiv |
| 113 | lrem |
| 114 | frem |
| 115 | drem |
| 117 | Lneg |
| 118 | Fneg |
| 119 | Dneg |
| 121 | Lshl |
| 123 | Lshr |
| 125 | Lushr |
| 132 | Iinc |
| 134 | i2f |
| 135 | i2d |
| 137 | l2f |
| 138 | l2d |
| 139 | f2i |
| 140 | f2l |
| 141 | f2d |
| 142 | d2i |
| 143 | d2l |
| 144 | d2f |
| 148 | Lcmp |
| 149 | Fcmpl |
| 150 | fcmpg |
| 151 | dcmpl |
| 152 | dcmpg |
| 170 | table switch |
| 171 | lookup switch |
| 172 | ireturn |
| 173 | lreturn |
| 174 | freturn |
| 175 | dreturn |
| 176 | areturn |
| 177 | return |
| 178 | getstatic |
| 179 | putstatic |
| 180 | getfield |
| 181 | putfield |
| 182 | invoke virtual |
| 183 | invoke special |
| 184 | invoke static |
| 185 | invoke interface |
| 187 | new |
| 188 | new array |
| 189 | anew array |
| 191 | athrow |
| 192 | checkcast |
| 193 | instanceof |
| 194 | monitor enter |
| 195 | monitor exit |
| 196 | wide |
| 197 | multianew array |
| 200 | goto_w |
| 201 | jsr_w |
| 214-225 | "quick" versions of 182-193 |

With these implementation choices, generally at least 70% of the Java™ instructions will be executed in the processor directly, while not more than 30% will be trapped and executed as RISC programs. These percentages are derived from dynamic measurements and typically would be about 90% and 10% for most Java™ programs. Other choices as to which Java™ instructions to trap and execute as RISC programs can be made, depending in large part on the hardware design and latency requirements.

The present invention improves RISC access to Java™ operand stack values during execution of trapped Java™ instructions. Remapping of register locations ensures that the RISC execution of trapped instructions correctly accesses the top of the Java™ operand stack, and that the results of the trapped operation are accessible upon return to the Java™ state.

The invention claimed is:

1. A microprocessor for executing byte-compiled stack machine code as hardware, the microprocessor comprising:
a processor core with an associated processor control unit configurable to execute a first set of stack machine instructions in the processor core when in a stack machine state and to execute both native instructions and a second set of stack machine instructions as native microcode in the processor core when in a native processor state, the processor control unit responsive to processor state control information contained in a system status register that designates the processor state at any given time;
a register file in a data path of the processor core and including a plurality of register elements, the register file accessible by the processor control unit by means of register addresses specified by either stack machine or native microcode instructions;
a stack machine operand stack pointer register that contains information pointing to a register element in the register file which is the current top of a stack machine operand stack; and
a register remap unit for each register access port of the register file and coupled to the processor control unit to receive instruction-specified register addresses therefrom and coupled to the register access ports to supply physical address values of register elements in the register file therefore such that whenever a remap bit in the system status register is set, the physical address value supplied by the register remap unit is a specified maximum value of the operand stack pointer register minus a current register number value contained in the operand stack pointer register.

2. The microprocessor as in claim 1 wherein said native processor state is a RISC state, the native instructions are RISC instructions, and the native microcode for executing the second set of stack machine instructions are RISC microcode.

3. A microprocessor for executing byte-compiled stack machine code as hardware, the microprocessor comprising:
a processor core;
a stack machine control module to execute a first set of stack machine instructions in the processor core;
a native control module to execute native instructions in the processor core and to execute a second set of stack machine instructions in the processor core as native microcode;
a set of system registers accessible to said stack machine and native control modules, including a status register containing processor state control information designating which one of said control modules is operative at any given time; and
a register file in a data path of the processor core and accessible by both control modules, said register file including a plurality of register elements, the native control module viewing the plurality of register elements as storage registers, the stack machine control module viewing a first portion of the register elements as a stack machine operand stack and a second portion of the register elements as storage registers;

wherein the set of system registers also includes a stack machine operand stack pointer that points to that register element in the register file which is current top of the stack, and the status register also contains a stack machine register remap bit, such that whenever the remap bit is set, the native control module executing stack machine instructions of the second set as native microcode treats register numbers specified by instructions in the native microcode as corresponding to a specified register element relative to the top of the stack, the corresponding register relative to the top of the stack that is accessed by a native microcode instruction is the maximum value of the operand stack pointer minus the register number specified by the stack machine operand stack pointer.

4. The microprocessor as in claim 3, such that whenever the remap bit has been reset, the native control module treats register numbers specified by native instructions as designating a corresponding storage element of the register file.

5. The microprocessor as in claim 3, wherein the remap bit is disregarded by the stack machine control module.

6. The microprocessor as in claim 3, wherein stack machine instructions of the second set are more complex than those of the first set, the instructions of the second set being incapable of being executed in the processor core within one clock cycle.

7. The microprocessor as in claim 6, wherein the second set of stack machine instructions includes instructions for creating and manipulating stack machine objects.

8. The microprocessor as in claim 6, wherein the second set of stack machine instructions includes instructions that operate upon long and floating-point data types.

9. The microprocessor as in claim 6, wherein the second set of stack machine instructions include double-type instructions.

10. The microprocessor as in claim 3, wherein the processor core is a RISC processor, the native instructions are RISC instructions, and the native microcode for implementing the second set of stack machine instructions are RISC microcode.

11. The microprocessor as in claim 3, wherein the register file includes, as one of the register elements, a program counter containing a memory address of an instruction to be executed.

12. The microprocessor as in claim 3, wherein the register file includes, as one of the register elements, a link register containing a return address for execution after completion of a subprogram call.

13. The microprocessor as in claim 3, wherein the register file includes, as one of the register elements, a native stack pointer to point to a temporary memory location for accessing local variables whenever the register file is full.

14. The microprocessor as in claim 3, wherein the set of system registers includes stack machine local variable registers in the data path of the processor core and accessible by the stack machine control module for temporary storage of stack machine local variables and parameters outside of said stack machine operand stack.

15. The microprocessor as in claim 3, wherein the set of system registers includes a stack machine trap base-address register containing a memory base address to microcode for the second set of stack machine instructions.

16. A method of executing stack machine instructions in a microprocessor, wherein a subset of said stack machine instructions is executed as microcode in a native processor state, the method comprising:

(a) providing a processor control unit to control execution by said microprocessor of native instructions in the native processor state, of a first subset of stack machine instructions in a stack machine processor state, and of a second subset of stack machine instructions as native microcode in the native processor state, the processor control unit responding to processor state control information contained in a system status register that designates the processor state at any given time, the microprocessor having a register file in a data path thereof, a stack machine operand stack pointer, and a register remap unit, all accessible to the processor control unit, the register file including a plurality of register elements accessed by register addresses specified by any of the instructions;

(b) executing a first set of stack machine instructions by the microprocessor in a stack machine state until the processor control unit recognizes a second subset stack machine instruction;

(c) upon recognizing any second subset stack machine instruction, switching the microprocessor to a native processor state and executing native microcode corresponding to said second subset stack machine instruction, such that registers specified by instructions of the native microcode are remapped by the register remap unit relative to a current top-of-stack location designated by the stack machine operand stack pointer, the corresponding register relative to the top of the stack which is accessed by the native microcode instruction being the maximum value of the operand stack pointer minus the register number specified by the stack machine operand stack pointer;

(d) upon completion of the native microcode for the second subset stack machine instruction, returning the microprocessor to the stack machine state and resuming execution of stack machine instructions; and (e) repeating steps (b) through (d) until the completion of all stack machine instructions.

17. The method of claim 16 further comprising executing in a native processor state any native instructions other than native microcode corresponding to second subset stack machine instructions such that registers addresses specified by any such other native instructions directly correspond to the register elements indicated by such addresses without remapping.

18. The method of claim 16 wherein executing native microcode corresponding to a second subset stack machine instruction includes accessing the microcode from a memory by the processor control unit, the accessing including applying an offset specified for that particular second subset stack machine instruction to a stack machine trap base address contained in a register accessible to the processor control unit to obtain an offset address indicating a memory location where the corresponding microcode begins.

19. The method of claim 16 wherein the microprocessor is a RISC processor with its native state being a RISC state, the native instructions being RISC instructions and the native microcode being RISC microcode.

20. A method of executing stack machine instructions in a microprocessor, wherein a subset of said stack machine instructions is executed as microcode native to said microprocessor, the method comprising:

(a) providing a stack machine control module to control direct execution by said microprocessor of a first subset of stack machine instructions, and a native control module to control direct execution by said microprocessor of native instructions, the native control module also controlling execution of a second subset of stack machine instructions as native microcode, the microprocessor having a register file in a data path of the microprocessor and a set of system registers, both accessible by said stack machine and native control modules, the register file including a plurality of register elements, such that the native control module views the plurality of register elements as storage registers and the stack machine control module views a first portion of the register elements as a stack machine operand stack and the second portion of the register elements as storage registers, the set of system registers including a stack machine operand stack pointer that points to a register element in the register file that which is a current top of the stack, the set of system registers also including a status register containing a stack machine register remap bit;

(b) executing a first set of stack machine instructions by the microprocessor under control of the stack machine control module until a stack machine instruction of the second set is recognized;

(c) upon recognizing a stack machine instruction of the second set, accessing corresponding native microcode for that stack machine instruction, setting the stack machine register remap bit, turning operation over to the native control unit, and executing the native microcode, such that, when executing native instructions in said microcode, registers specified by those native instructions are treated as corresponding to a specified register element of the register file that is relative to the current top of the stack, the corresponding register relative to the top of the stack which is accessed by the native microcode instruction being the maximum value of the operand stack pointer minus the register number specified by the stack machine operand stack pointer;

(d) upon completion of the microcode for the stack machine instruction of the second set, returning operation to said stack machine control unit and resuming execution at the next stack machine instruction; and (e) repeating steps (b) through (d) until the completion of all stack machine instructions.

21. The method of claim 20, wherein turning operation over to the native control unit and returning operation to the stack machine control unit are mediated by processor state control information in the status register.

22. The method of claim 20, wherein the set of system registers includes a stack machine trap base-address register containing a memory base address to the native microcode, and accessing the corresponding native microcode for a particular stack machine instruction of the second set involves applying an offset specified for that instruction to the base address and then accessing memory at the resulting offset address.

23. The method of claim 20, wherein stack machine instructions of the second set are more complex than those of the first set, the instructions of the second set being incapable of being executed by the microprocessor within one clock cycle as atomic instructions.

24. The method of claim 23, wherein the second set of stack machine instructions includes instructions for creating and manipulating stack machine objects.

25. The method of claim 24, wherein the second set of stack machine instructions includes instructions that operate upon long and floating-point data types.

26. The method of claim 25, wherein the second set of stack machine instructions includes double-type instructions.

27. The method of claim 26, wherein the microprocessor is a RISC processor, the native instructions are RISC instructions, and the native microcode for implementing the second set of stack machine instructions are RISC microcode.

\* \* \* \* \*